R. S. HIGGINS.
Plow Colter.
No. 83,061.
Patented Oct. 13, 1868.
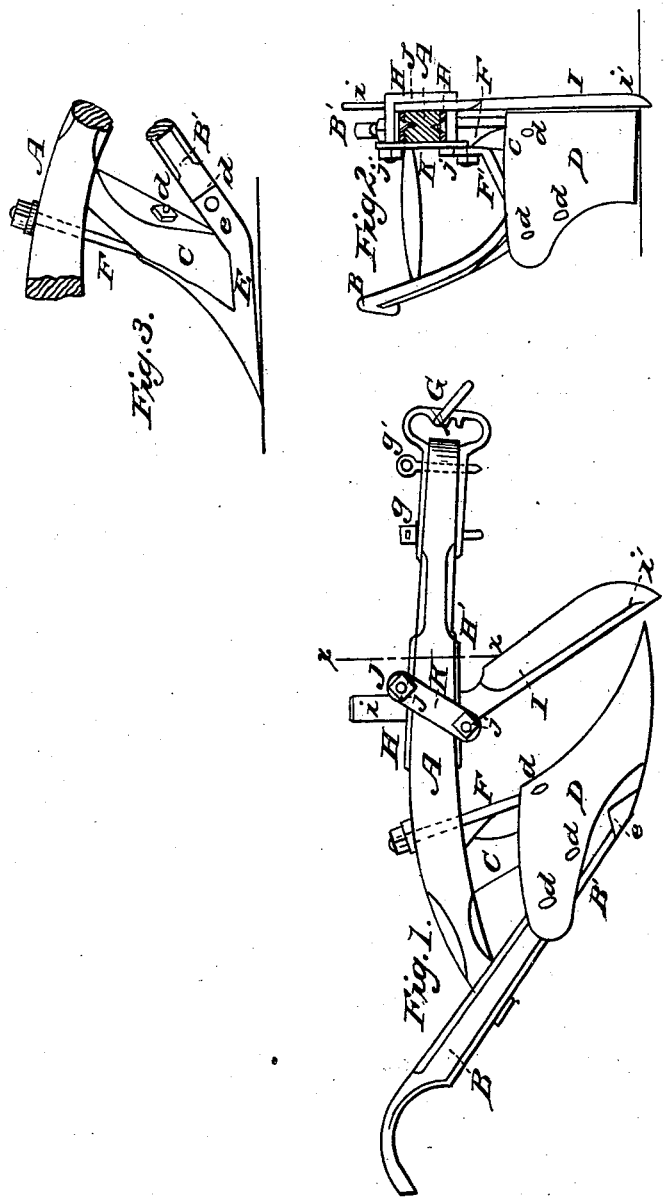

ROZANDER S. HIGGINS, OF OLNEY, ILLINOIS.

Letters Patent No. 83,061, dated October 13, 1868.

IMPROVEMENT IN PLOWS.

The Schedule referred to in these Letters Patent and making part of the same.

*To all whom it may concern:*

Be it known that I, ROZANDER S. HIGGINS, of Olney, in the county of Richland, and State of Illinois, have invented certain new and useful Improvements in Plows; and I do hereby declare that the following is a sufficiently full, clear, and exact description thereof, to enable one skilled in the art to which my said invention appertains to make and use it, reference being had to the accompanying drawing, which is made a part of this specification.

The subject of my invention is a breaking-plow, of improved construction and operation.

My improvement consists in the combination of a share and coulter, of peculiar construction, for the purpose of adapting the plow to work with greater ease and better effect.

In the drawing—

Figure 1 represents a side elevation of a plow, embodying my improvements;

Figure 2 is a front elevation thereof, with the beam in vertical section on the line $x$-$x$, fig. 1; and Figure 3 is a detached view of the landside.

A may represent the beam of the plow, B B' the handles, C the standard, D the mould-board, E the landside, F a bar, connecting the "iron" to the beam, and F' a brace for supporting the upper end of the mould-board.

G represents the clevis, and $g$ $g'$ its attaching-bolts.

H H are metallic bars or plates, secured to the upper and under sides of the beam for the attachment of the coulter I.

J represents a loop or bracket, embracing the coulter and beam.

K, a plate, bearing against the opposite side of the beam, and provided with perforations for the reception of the ends of said bracket, and $j$, nuts applied to the threaded ends of the bracket, to clamp the coulter against the beam.

The beam A is curved, as represented in fig. 1, so that the draught shall be so applied to the plow as that its point only shall be in contact with the bottom of the furrow, the position of its coulter being such as to adapt the draught on it to balance the furrow-slice on the mould-board, thus adapting the plow to be drawn through the furrow with scarcely any frictional contact of its landside or sole, and entirely free from side-draught.

The landside-bar E, of my plow, is shorter in proportion than that of other forms of plows, and its rear end is upturned to afford attachment for the handle B', as shown at $e$. Its form further adapts the plow to be more readily tipped back to lift the whiffle-tree, &c., over stumps, and for other purposes, than the ordinary form.

The form of the mould-board may be varied, as preferred, and the entire "plow-iron" D E may be made of wrought or cast-iron, or steel, in one piece, as represented, or in any other approved mode, and be attached to the standard and handles by bolts, $d$, as represented, or any other suitable means.

The coulter I is attached on the left or landside of the beam, a little in front of the point of the plow, as shown in fig. 1, and is arranged to the left or landside of the plow proper, and also at a greater depth, (as shown in figs. 1 and 2,) to adapt it to cut deeper and wider than the share, and thus prevent the plow binding in the furrow. This arrangement of the coulter being further useful for balancing the weight of the furrow-slice, and thus preventing side-draught, as before explained.

The coulter is constructed with a stem or shank, $i$, at a suitable angle to adapt it to be firmly supported in its attaching-devices, and its point is curved or rounded, as seen at $i'$, to adapt it to ride over roots, &c., too large to be cut by it. The attaching-devices of the coulter adapt it to be securely held without any notching and consequent weakening of its shank, and also to be more readily removed and attached than any other form of fastening with which I am acquainted.

Having described my invention,

What I claim as new therein, and desire to secure by Letters Patent, is—

The combination of the prolonged coulter I with its rearwardly-curved cutting-point $i'$, and the obliquely-presented share D, so arranged that its sole does not run in contact with the floor of the furrow, all constructed and operating as and for the purposes herein specified.

ROZANDER S. HIGGINS.

Witnesses:
H. W. WHITE,
D. H ALVIS.